United States Patent Office 3,501,695
Patented Mar. 17, 1970

3,501,695
RESONANCE MEASURING APPARATUS UTILIZING THE SIDEBAND SIGNALS OF AN FM-TEST SIGNAL FOR FEEDBACK CONTROL
Leon Näsström, Bromma, Sweden, assignor to Telefonaktiebolaget L M Ericsson, Stockholm, Sweden, a corporation of Sweden
Filed Mar. 18, 1966, Ser. No. 535,375
Claims priority, application Sweden, Apr. 8, 1965, 4,582/65
Int. Cl. G01r 23/12
U.S. Cl. 324—82      5 Claims

ABSTRACT OF THE DISCLOSURE

Apparatus for automatically measuring the resonance frequency of a series resonant circuit utilizes feedback signals related to generated sidebands for varying the frequency of a test signal fed to the series resonant circuit. The test signal is generated by an FM-signal generator whose output signal is controlled by a control voltage. The control voltage is generated by a phase detector which compares the sideband signals transmitted by the resonant circuit and a low frequency modulating signal.

---

The present invention refers to a circuit arrangement for measuring the resonance frequency of series resonant circuits.

It is important to be able to measure with accuracy the series resonance of, for instance, crystals used for the control of oscillators. The known measuring devices are substantially designed for measuring according to any of the two following methods.

According to the one method, usually called the oscillator method, the crystal functions as a reactive element in an oscillator. With the connection terminals of the crystal short-circuited the oscillator frequency is adjusted to the rated frequency of the crystal; thereafter the crystal is connected and the resulting frequency observed. This method is a relatively time consuming one and does not give a satisfactory accuracy. According to the other method, usually called the passive method, the crystal is used as a filter for the frequency of a signal generator, said frequency being varied and the amplitude of the outgoing signal observed. This method is relatively quick but gives like the first-mentioned method an unsatisfactory accuracy because of the necessity of observing a quantity that has a flat maximum.

The present invention gives a big improvement over the known devices. The measuring procedure is quicker, specially as the exact adjustment to the maximum of the resonance curve occurs automatically. The invention contemplates a circuit arrangement which comprises a signal generator for generating a variable measuring frequency that is supplied to the input of the resonance circuit. The output of the circuit is connected to a detector for indicating the amplitude of the outgoing signal. The invention is specially characterized by the signal generator being an FM-signal generator, the mean frequency of which is adjustable by means of a direct voltage. The FM-signal generator is arranged to be modulated by means of the signal from a low frequency oscillator and by the detector. The detector includes a phase detector for comparing the phase of the predominant side band wave, derived from the modulation and present in the inlet circuit of the series resonant circuit, with the phase of the original modulating signal. The phase detector is designed to give, as a result of the comparison, a direct voltage signal at its output. The detector further includes an integrating network to smooth the direct voltage signal as well as a summation network to feed the network a direct voltage signal together with the modulation signal to the FM-signal generator to govern its mean frequency.

Figure 1:
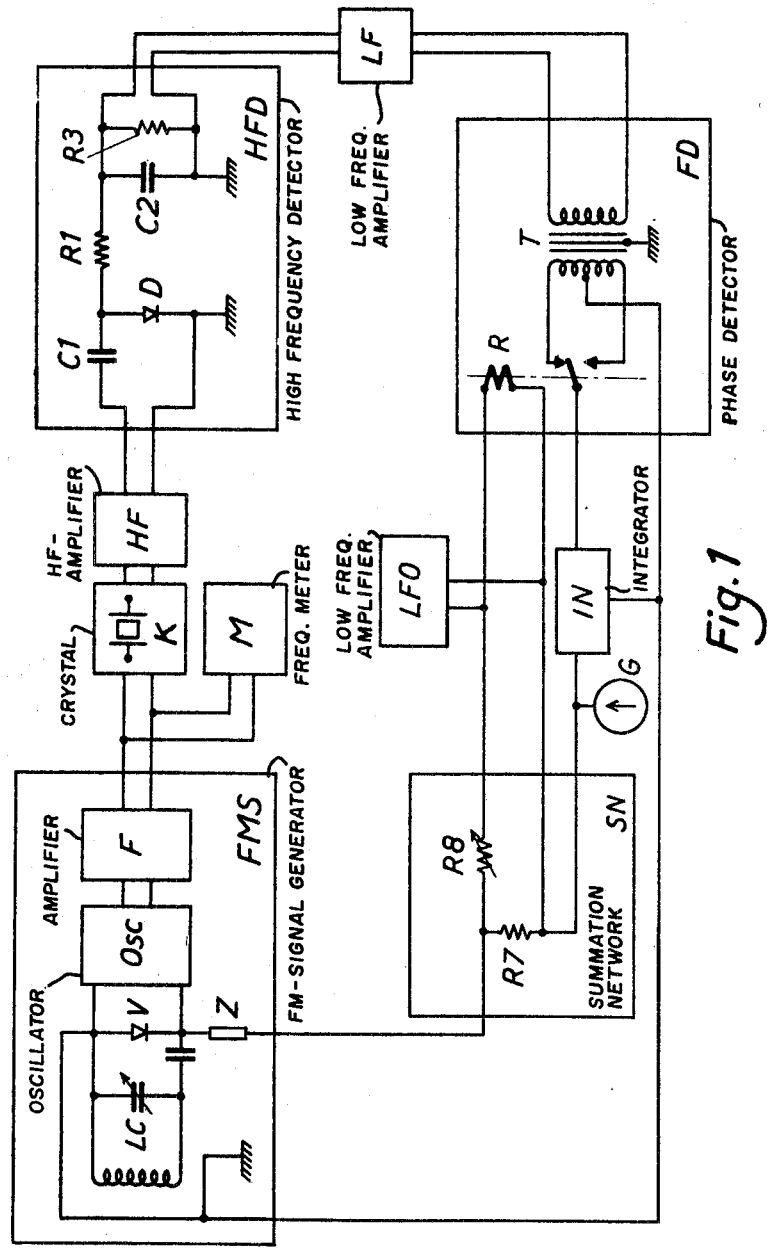
Figures 2A, 2B:
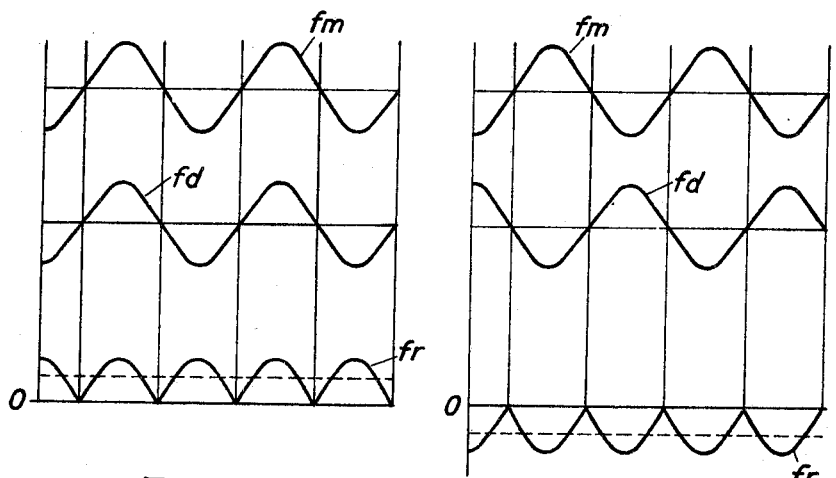

The invention will be further described by means of an embodiment with reference to the attached drawing in which FIG. 1 is a block diagram in which those details are shown which are necessary for the understanding of the principle of the invention, and FIG. 2 represents the modulating signal together with the signals obtained from the detector devices.

In FIG. 1 K is a crystal, the series resonance of which is to be measured. FMS is an FM-signal generator comprising an oscillator Osc and an amplifier F. The oscillator is provided with a tuning circuit LC for tuning to desired mean frequency as well as a varactor V for controlling the frequency. M is a frequency meter on which the frequency of the outgoing signal can be read. HF is a high frequency amplifier and HFD a high frequency detector. The high frequency detector comprises an isolating capacitor C1 and a diode D as well as an integrating network R1, C2 with a shunt resistor R3. LF is a low frequency amplifier and FD a phase detector. The phase detector comprises a transformer T with a centre tap on the secondary winding and a relay R that is operated by current from a low frequency oscillator LFO. IN is an integrating network for the outgoing signal of the phase detector FD and SN a summation network comprising resistors R7 and R8. G is a deviation indicator, for instance a galvanometer.

When measuring, the signal generator FMS is set approximately to the rated frequency of the crystal, while at the same time observing that there is no deflection on the galvanometer G. The modulating frequency generated by the low frequency oscillator LFO is selected in such a way as to cover approximately half the band width of the crystal. The modulating frequency signal is adjusted by means of the resistor R8, so that the modulation index (i.e. the relation between the frequency deviation and the modulating frequency) is of the order of 0.1–0.2, whereby an output is obtained from the signal generator that consists substantially of the carrier frequency and the first side band wave pair with an amplitude that is approximately 10% of the carrier wave amplitude. The other modulation components are of no interest as they fall outside of the band width of the crystal K and consequently are practically fully eliminated.

From the crystal K the signal passes through high frequency amplifier HF, whereafter it is demodulated in the high frequency detector HFD. Provided the carrier frequency coincides with the resonance frequency of the crystal, one cannot distinguish the voice frequency modulation components after the detection because the two side band waves are located at equal distances from the resonance frequency, on either side of said frequency and consequently are attenuated to equal extent. If on the contrary the signal is displaced with reference to the resonance frequency the one side band wave will be closer to the resonance frequency and less attenuated while the other will be further away therefrom and consequently more attenuated. Thus an AM-component (voice frequency) appears and may be detected. It is to be observed that when the lower side band predominates, the detected AM-component is substantially in phase with the original modulating wave, and when the higher side band frequency predominates, the AM-component will be displaced from the original modulating wave by about 180°. The output signal from the high frequency detector HFD is amplified in the low frequency amplifier LF and thereafter conducted to the transformer T of the phase detector FD. The relay R is energized during the one half cycle of the modulating wave $f_m$ (see FIG. 2) from low frequency oscillator LFO and deenergized during the other half cycle. During the first-mentioned half cycle an output signal is obtained from the upper half of the secondary winding of transformer T and during the second half cycle from the lower half of the same winding. When the AM-detected wave $f_d$ from detector HFD via amplifier LF is in phase with the modulating wave $f_m$ (FIG. 2A), a pulsating positive signal $f_r$ is obtained at the outlet of the phase detector FD. However, when the detector $f_m$ wave $f_d$ is displaced 180° (FIG. 2B), a negative pulsating signal $f_r$ is obtained. The signal is smoothed by the integrating network IN and thus gives a positive or negative direct voltage as indicated by the dotted lines of FIG. 2. This direct voltage is added to the modulating signal in summation network SN, and supplied to the varactor V through the impedance Z, whereby the deviations of the generator frequency from the resonance frequency of the crystal are automatically counteracted.

While for the previously known devices, the measuring accuracy normally is of about $5 \cdot 10^{-6}$ of the crystal frequency one can now without difficulty by the invention achieve a measuring accuracy of $1 \cdot 10^{-7}$. If, for instance, the crystal is exposed to temperature changes, the frequency of the signal generator will all the time follow the resonance of the crystal, whereby the temperature dependence of the crystal may be ascertained with great precision.

I claim:

1. Apparatus for measuring the resonance frequency of a series resonant circuit which has an input and an output, said apparatus comprising: a voltage controlled FM-signal generator including an output for transmitting FM-signals and a control input for receiving a voltage for controlling the frequency of the FM-signals; means for connecting the output of said FM-signal generator to the input of said series resonant circuit whereby the latter transmits signals having side bands; a low frequency signal generator including an output for transmitting low frequency modulation signals; detector means connected to the output of said low frequency signal generator and the output of said series resonant circuit for generating a D.C. voltage related to the relative amplitudes of the side band signals and the phase relationship between the side band signals and the modulation signals; and means for transmitting the D.C. voltage generated by said detector means and the modulation signals generated by said low frequency signal generator to the control input of said FM-signal generator.

2. The apparatus of claim 1, wherein said transmitting means includes a signal summing means including a first input for receiving the modulation signals, a second input for receiving the D.C. voltage generated by said detector means and an output for transmitting a signal proportional to the sum of said modulation signals and the D.C. generated voltage.

3. The apparatus of claim 1, wherein said detector means comprises a phase detector means for comparing the phase relation between the modulation signals and side band signals for generating a voltage related to their phase difference, and integrating means for smoothing the voltage generated by said phase detector means to a D.C. voltage.

4. The apparatus of claim 3, wherein said transmitting means includes a signal summing means including a first input for receiving the modulation signals, a second input for receiving the D.C. voltage generated by said detector means, and an output for transmitting a signal proportional to the sum of said modulation signals and the D.C. generated voltage.

5. The apparatus of claim 3, wherein said phase detector means comprise: a high frequency detector means having an input connected to the output of said series resonant circuit and an output for delivering low frequency signals related to the frequency of the side band signals; and phase comparator means for phase comparing the low frequency signals generated by said phase detector means and the modulation signals generated by the D.C. voltage.

References Cited

UNITED STATES PATENTS

| | | | |
|---|---|---|---|
| 2,380,791 | 7/1945 | Rosencrans | 324—81 |
| 3,023,370 | 2/1962 | Waller. | |
| 3,174,099 | 3/1965 | Larson | 324—0.5 |
| 3,245,005 | 4/1966 | Garfield | 324—81 X |

RUDOLPH V. ROLINEC, Primary Examiner

P. F. WILLE, Assistant Examiner

U.S. Cl. X.R.

324—56